J. B. GODWIN.
Presses.

No. 140,033. Patented June 17, 1873.

Witnesses:
Fred Haynes
David Mitell

J. B. Godwin

UNITED STATES PATENT OFFICE.

JOSHUA B. GODWIN, OF WASHINGTON, NORTH CAROLINA.

IMPROVEMENT IN PRESSES.

Specification forming part of Letters Patent No. 140,033, dated June 17, 1873; application filed September 16, 1872.

*To all whom it may concern:*

Be it known that I, JOSHUA B. GODWIN, of Washington, in the county of Beaufort and State of North Carolina, have invented a new and useful Improvement in Presses for Baling Cotton and other Substances; and I do hereby declare that the following is a full, clear, and exact description of the same, reference being had to the accompanying drawing forming part of this specification, and in which—

Figure 1:
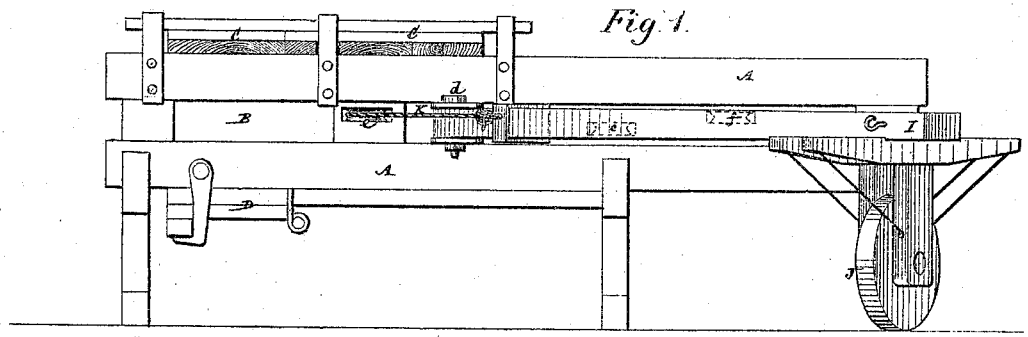
Figure 3:
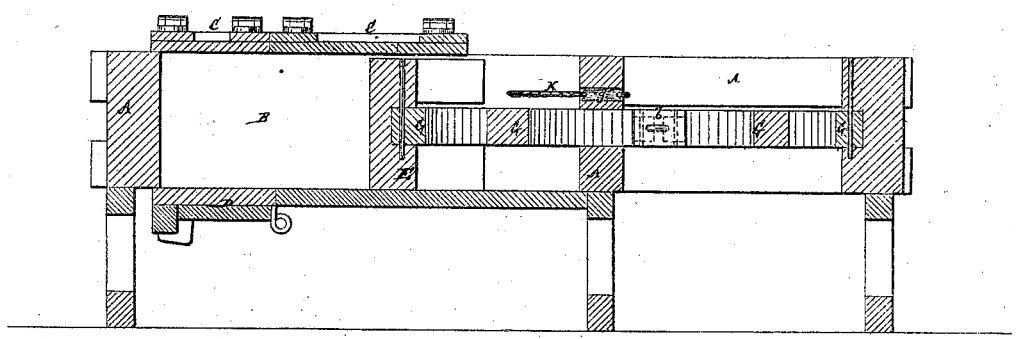
Figure 2:
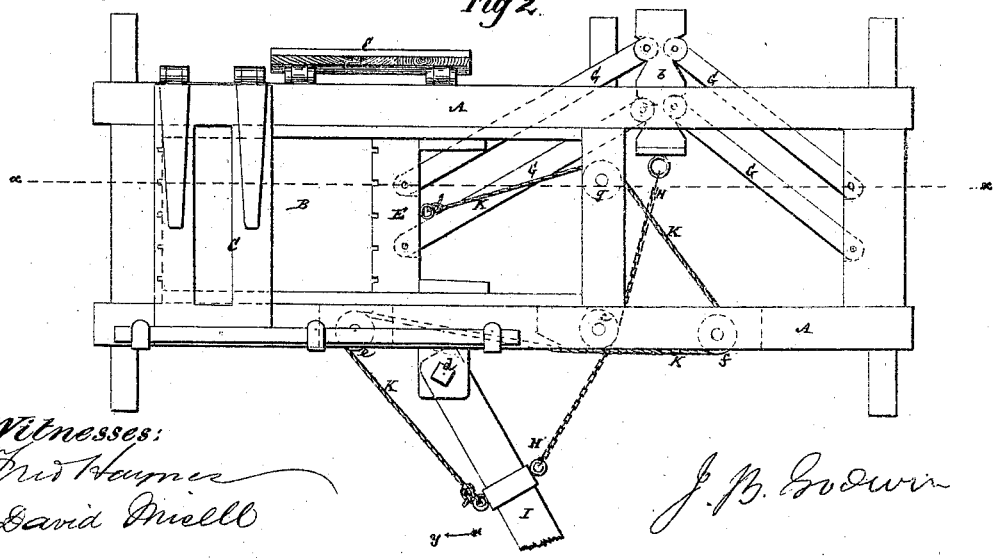

Figure 1 represents a side elevation of a press constructed in accordance with my improvement; Fig. 2, a plan of the same; and Fig. 3, a longitudinal vertical section at the line $x\ x$, Fig. 2.

Similar letters of reference indicate corresponding parts.

The object of this invention is to produce a press applicable to pressing or baling cotton, hay, and other substances, by horse or other animal power, which, while simple and efficient or powerful, shall be of such easy construction that any plantation or farm hand, having a knowledge of carpentry, will be able to make and repair the same when needed. The invention consists in a novel combination of double toggle-joints for operating the plunger of the press, a vibrating draft pole or sweep supported by a wheel from the ground, and certain chains or ropes (with guides or pulleys) arranged to establish connection between the sweep, the toggle-joints, and the plunger to give the necessary pressing and return action to the latter, the whole being arranged so that the press occupies a horizontal position; or in other words, its plunger and operating-sweep, to which the animal is hitched, move in horizontal directions; thereby avoiding the necessity of guide-posts to the toggle, and giving great stability and convenience.

In the accompanying drawing, A represents the horizontal frame of the press supported at a suitable height from the ground by cross frames or bearers, and having arranged at its one end a horizontal pressing and baling chamber, B, which is provided with top lids or doors C C, to facilitate filling or loading; also with a bottom end lid or door, D, to provide for discharge of the pressed bale, and, in conjunction with the upper end lid or door, to likewise provide for the baling of the pressed substance, or rather for securing the bale by straps or ropes passed down or up through grooves in the fixed end of the pressing-chamber B, and in the face of the plunger E, as usual in other baling presses. The plunger E has its pressing action or inward motion within the pressing-chamber given it by means of horizontally-arranged toggle-joints G G, connected at their one end to the plunger, and at their opposite end to the back end of the main frame A, and intermediately connected with a cross link or piece $b$, to form the toggle. This cross piece or link $b$ is connected by a chain, H, which passes round a pulley, $c$, with a horizontally-vibrating draft pole or sweep, I, pivoted at $d$ to the one side of the main frame A, and supported near its outer end by a ground-wheel, J, so that on said sweep being drawn by the horse in direction of the arrow $y$ the toggle-joints G G will be gradually operated from a fixed position to a straight or nearly straight one, to produce the necesary pressure on the bale. To return the plunger and its operating parts to their normal position the sweep I is worked in the reverse direction, a rope or chain, K, passing over or round pulleys $e\ f\ g$, and fastened at its ends to the plunger and sweep, respectively, serving to draw the plunger back and to flex the toggle-joints, as required, for a repetition of the pressing-action.

A press thus constructed and provided is at once durable and efficient, combining great power with convenience; and, apart from being cheap, is of such simple construction that a comparatively unskilled hand may construct or repair it.

What is here claimed, and desired to be secured by Letters Patent, is—

The double toggle-levers G G G G, pivoted, respectively, to the platen E and the end frame A, and to an intermediate draft-block, $b$, for operation by the vibrating-lever I, through chains or ropes H K, all arranged and combined substantially as shown and described.

J. B. GODWIN.

Witnesses:
MICHAEL RYAN,
FRED. HAYNES.